(12) United States Patent
Yeo et al.

(10) Patent No.: US 9,712,895 B2
(45) Date of Patent: Jul. 18, 2017

(54) DISTRIBUTED WIRELESS SENSING SYSTEM

(71) Applicant: Singapore University of Technology and Design, Singapore (SG)

(72) Inventors: Kian Peen Yeo, Singapore (SG); Suranga Chandima Nanayakkara, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 0 days.

(21) Appl. No.: 14/760,116

(22) PCT Filed: Dec. 20, 2013

(86) PCT No.: PCT/SG2013/000545
§ 371 (c)(1),
(2) Date: Jul. 9, 2015

(87) PCT Pub. No.: WO2014/109710
PCT Pub. Date: Jul. 17, 2014

(65) Prior Publication Data
US 2015/0358696 A1    Dec. 10, 2015

Related U.S. Application Data

(60) Provisional application No. 61/750,578, filed on Jan. 9, 2013.

(51) Int. Cl.
*G08C 19/22* (2006.01)
*H04Q 9/00* (2006.01)
(Continued)

(52) U.S. Cl.
CPC .............. *H04Q 9/00* (2013.01); *G08B 25/10* (2013.01); *H04W 84/18* (2013.01); *G08B 25/14* (2013.01); *H04Q 2209/40* (2013.01)

(58) Field of Classification Search
None
See application file for complete search history.

(56) References Cited

U.S. PATENT DOCUMENTS 6,735,630 B1 * 5/2004 Gelvin ............... B60R 25/1004
706/33
7,123,180 B1 * 10/2006 Daniell ................. G08C 17/02
341/176
(Continued)

FOREIGN PATENT DOCUMENTS

WO         0126068 A1    4/2001

OTHER PUBLICATIONS

Ballagas, R. et al. "iStuffMobile: Rapidly Prototyping New Mobile Phone Interfaces for Ubiquitos Computing". Proceedings of the SIGCHI Conference on Human Factors in Computing Systems (CHI'07), ACM, 2007, p. 1107-1116.
(Continued)

*Primary Examiner* — George Bugg
*Assistant Examiner* — Renee Dorsey
(74) *Attorney, Agent, or Firm* — Lerner, David, Littenberg, Krumholz & Mentlik, LLP

(57) ABSTRACT

A device comprising: at least one input sensor, at least one output transducer, a wireless communication module, and a processor configured to receive a local control parameter from the input sensor or a remote control parameter from a remote module communicating with the processor via the wireless communication module, and selecting one a of a plurality of operational configurations de-pending on the local and remote control parameters, each of the plurality of operational configurations including a predetermined threshold for a sensing parameter received from the input sensor, and an output response if the sensing parameter breaches the threshold.

16 Claims, 18 Drawing Sheets

(51) Int. Cl.
G08B 25/10 (2006.01)
H04W 84/18 (2009.01)
G08B 25/14 (2006.01)

(56) References Cited

U.S. PATENT DOCUMENTS

| | | | | |
|---|---|---|---|---|
| 8,159,476 B2* | 4/2012 | Kim | ............ | G06F 3/0362 |
| | | | | 345/156 |
| 8,725,462 B2* | 5/2014 | Jain | ............ | G06F 19/3406 |
| | | | | 702/187 |
| 2003/0074489 A1* | 4/2003 | Steger | ............ | G01D 9/005 |
| | | | | 710/1 |
| 2006/0116175 A1* | 6/2006 | Chu | ............ | H04M 1/72569 |
| | | | | 455/567 |
| 2011/0231535 A1* | 9/2011 | Starnes | ............ | H04W 4/001 |
| | | | | 709/223 |
| 2012/0127317 A1* | 5/2012 | Yantek | ............ | G01V 8/14 |
| | | | | 348/156 |
| 2012/0215446 A1* | 8/2012 | Schunder | ............ | G07C 5/008 |
| | | | | 702/3 |

OTHER PUBLICATIONS

International Preliminary Report on Patentability for Application No. PCT/SG2013/000545 dated Apr. 29, 2013.
International Search Report and Written Opinion for Application No. PCT/SG2013/000545 dated Mar. 13, 2014.

* cited by examiner a)

b)

c)

(d)

(e)

(f)

(a)

(b)

Top view of a person's head

DISTRIBUTED WIRELESS SENSING SYSTEM

CROSS REFERENCE TO RELATED APPLICATIONS

The present application is a national phase entry under 35 U.S.C. §371 of International Application No. PCT/SG2013/000545, filed Dec. 20, 2013, published in English, which claims priority from U.S. Patent Application No. 61/750,578 filed Jan. 9, 2013, all of which are incorporated herein by reference.

FIELD

This invention relates to a distributed wireless sensing system.

BACKGROUND

Various networked sensors are known in the art, which allow remote collection of data for industrial and consumer applications. Also prior art products including Ninja Blocks™ and Twine™ include various sensors and a web app monitor the outputs. However neither product has any local reconfiguration of the sensing mode of the device.

Most smart phones or tablets include multiple sensors and may seem to be an 'all-round' solution for many applications. However, they might not be a cost effective solution when having to deploy multiple devices at various locations. Dedicated lost cost sensor devices deployed in large sensor networks may be cheaper, but may be complicated to setup and deploy. These sensor devices are also often a permanent installation that is inaccessible and non-spatially reconfigurable.

SUMMARY

Embodiments may seek to bring together the advantages of portability, accessibility and/or re-configurability into a single system.

In general terms in a first aspect the invention proposes a portable wireless sensor that is remotely and locally reconfigurable. This may have the advantage that controlling the device is very simple and user friendly.

In a second aspect the invention proposes an app or user interface that allows configuration of portable wireless sensors. This may have the advantage that the sensors, receivers and/or base station can interactively implement scenarios.

In a third aspect the invention proposes a wearable receiver dongle. This may have the advantage that the dongle can provide a simple and easy alert to specific sensors that have determined an alert condition.

A system may include distributed wireless sensor nodes that have tangible input user interfaces, a central data collection/management unit (base station) and wireless receiver devices that are able to receive notification on the status of sensor nodes. Sound (acquired through a microphone) may be used as an input to the sensor nodes.

Embodiments may have the advantage(s) that:
- a personal device can remotely monitor and interact with sensor nodes,
- simple and intuitive device for the non-expert users,
- network-enabled for multi-devices to support multi-input/multi-output configurations,
- spatially reconfigurable,
- pairing between sensor nodes and receiver devices by bringing them within close proximity,
- easily reconfigurable remote monitoring of sound events on specific objects or locations,
- easily reconfigurable remote output triggering on objects or at locations (e.g. sound or light),
- intuitive ways to set-up sensor nodes to autonomously respond to an sound input event (e.g. sensor input triggers a predefined output),
- sound based system to make everyday objects collaboration with each other,
- collective input monitoring/capturing may be selected,
- collective output may be selected,
- input from one object(s) triggering response on other object(s) or vice versa may be selected, and/or
- everyday objects may be transformed into sound based input devices that are able to interact with personal digital devices (e.g. cancelling a incoming call by tapping the sensor node placed inside a user's pocket).

In a first and second specific expression of the invention there is provided a distributed wireless sensing device according to claim 1 or 14. In a third specific expression of the invention there is provided a distributed wireless sensing system according to claim 7. Embodiments may be implemented according to any of claims 2 to 6 and 8 to 13.

BRIEF DESCRIPTION OF THE DRAWINGS

One or more example embodiments of the invention will now be described, with reference to the following figures, in which:

FIG. 11(*b*) is a screenshot of notification from a new sensor node;
FIG. 11(*c*) is a screenshot of configuring new sensor node by assigning it a name and a mode. In Alert mode, a user will be alerted with a sound, vibration and a message. In Ambient mode, a user only receives notification message;
FIG. 11(*d*) is a screenshot of displaying a history of activities and events and allows reconfiguring of devices;
FIG. 11(*e*) is a screenshot of setting up a sensor node as an object finder. User records a voice tag to associate it with the sensor node;
FIG. 11(*f*) is a screenshot of a user giving a voice command to activate sound on the sensor node;
FIGS. 12(*d*) to (*f*) are schematic drawings of a user physically interacting with the sensor node (d) Turning, (e) Pressing, (f) Shaking;

DETAILED DESCRIPTION

Humans have evolved to use sound (apart from vision) as one of the primary mediums for communication. In addition, humans perceive the world around them through their five senses (sight, sound, smell, touch and taste). Among these five senses, sound is perhaps the most natural 'active' form of two-way communication since human hear and produce sound naturally. Likewise, for natural 'passive' one-way communication to humans, the sense of sight and sound are perhaps the most efficient in terms of range. Embodiments may seek to enable users to extend their natural sense of sight and sound. Users may be able to 'hear further', 'speak further' and 'communicate' naturally with objects and the environment through a sound and light enabled input/output device distributed within their home or work environment, or even in remote locations.

Figure 1:
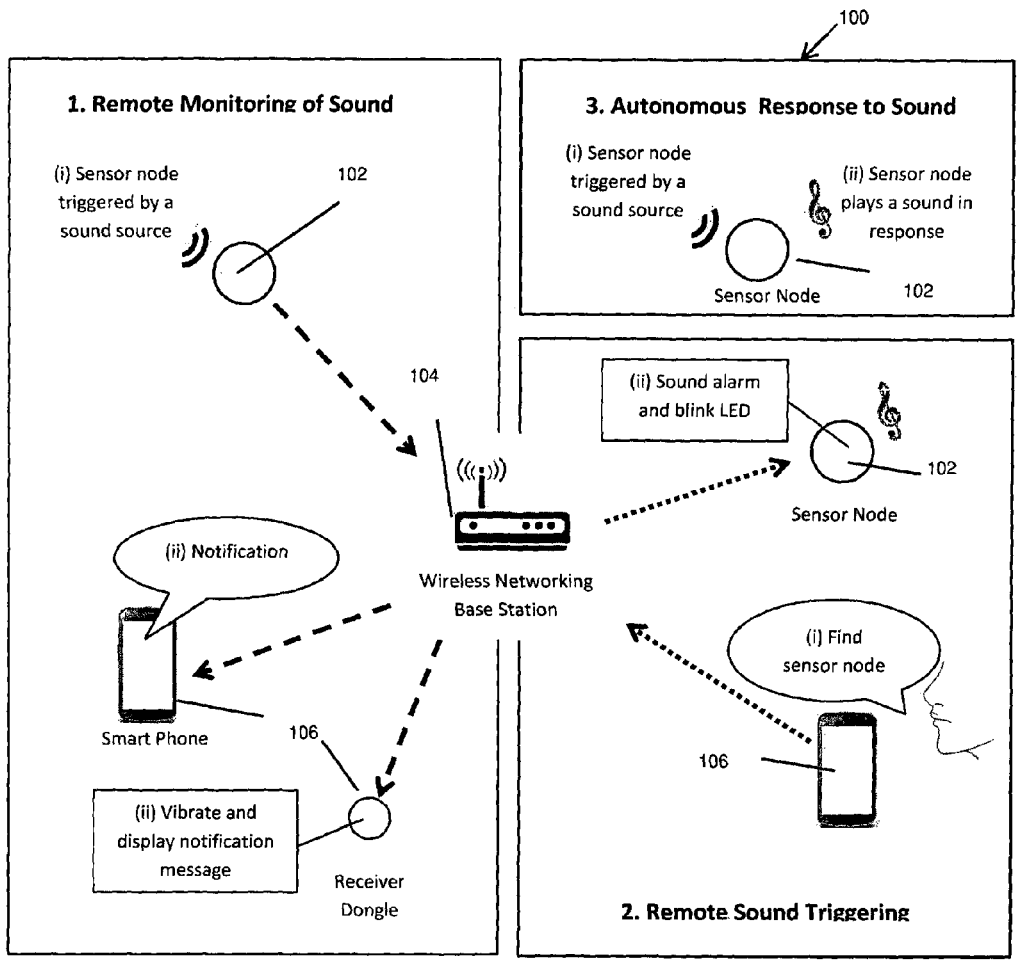
FIG. 1 is a block diagram of the overall technology.

According to a first embodiment shown in FIG. 1 distributed but interconnected (wireless) sensor nodes 102 may be sound based and have tangible user interfaces with input and output capabilities. The sensors nodes may wirelessly connect to other parts of the systems 100, including a wireless base station 104 and receiver devices 106 that can either be based on a computing (mobile) device with the associated software applications or a small receiver dongle.

Hardware i. Sensor Node

Figure 2:
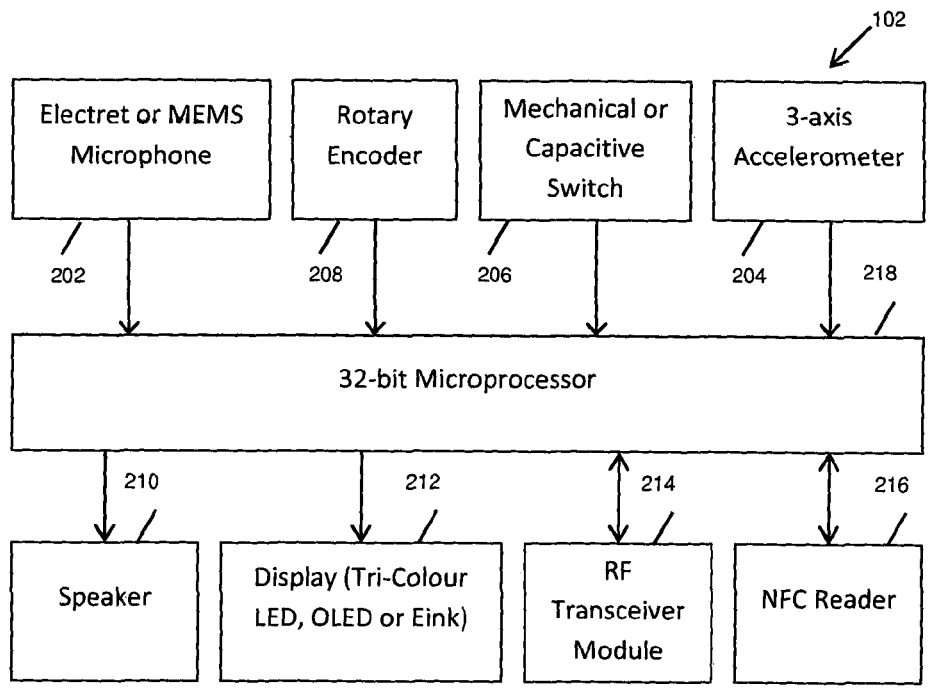
FIG. 2 is a hardware block diagram of a sensor node.

As shown in FIG. 2, each sensor node device 102 has an inbuilt microphone 202 for capturing sound inputs. This can be based on an electret or MEMS microphone. User inputs to the sensor node can be based on shaking the device, pressing or touching on one or more buttons on the device and rotating a knob on the device. The shaking action is captured by a 3-axis accelerometer 204. The press or touch action can be captured by a mechanical or capacitive switch 206. A mechanical or magnetic based rotary encoder 208 can capture the rotation action.

Sensor nodes provide both auditory and visual output. A diaphragm or MEMS speaker 210 is used to provide auditory output. Visual output can be based on one or more tri-colour LED lights 212 or a more complex display such as an OLED or E-Ink display.

Each sensor node has a wireless radio frequency (RF) module 214 which can be based on 2.4 GHz or sub-GHz frequency. The wireless module is used for exchanging messages between other sensor nodes and with the networking base station. A near field communication (NFC) reader 216 is available on the sensor node for contactless communication to establish pairing with receiver devices.

A 32-bit ARM microprocessor 218 is used for interfacing the input, output and wireless modules. The microprocessor should meet the following minimum requirements: processor speed of 48 MHz, 8 KB of RAM and 32 KB of FLASH, support for SPI, I2C, UART, ADC and GPIO. A rechargeable battery is used to power each sensor node.

For example an ARM Cortex-M4 microprocessor may be used. A MEMS microphone (ADMP401) with analog output is used for measuring audio signals which is fed into an amplifier circuit. Variable gain control on the amplifier is achieved through a digital potentiometer (MCP4131) acting as a feedback resistor. A mechanical push button switch is used for detecting user press input. A low profile shaft-less rotary encoder is used for detecting the turning gesture for users. A 3-axis accelerometer with analog outputs (ADXL335) is used detect a shake input from a user. A RGB led and 8 Ohm speaker is connected to the output ports of the microcontroller. Wireless connectivity is achieved using a proprietary 2.4 GHz transceiver (nRF24L01+). A contactless communication controller (PN532) is used for data exchange with receiver devices.

ii. Wireless Base Station

Figure 3:
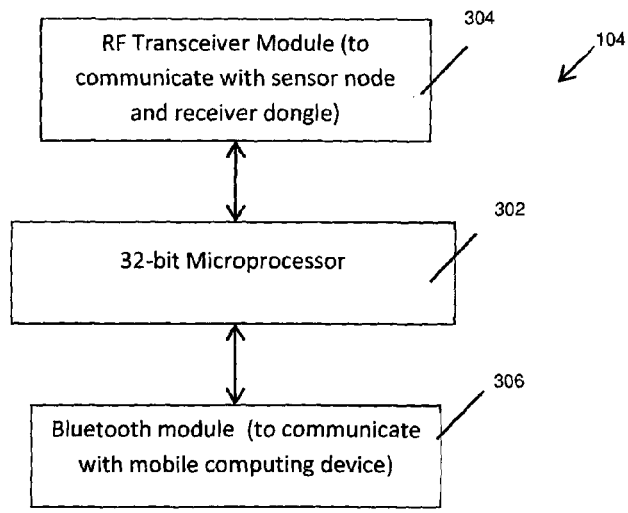
FIG. 3 is a hardware block diagram of a wireless base station.

FIG. 3 shows the wireless base station 104 used to relay messages between sensor nodes, and between sensor nodes and receiver devices. The hardware of the wireless base' station consists of a 32-bit ARM microprocessor 302 and wireless RF modules 304. The wireless base station 104 is powered from the mains supply through regulated power supply (not shown).

For example an ARM Cortex-M4 microprocessor may be used, connected to a nRF24L01+2.4 GHz transceiver (with power amplifier and external antenna for improved range) and a Bluetooth module 306. For compatibility with iOS devices and Android devices that support Bluetooth Low Energy (BLE), a BLE112 Bluetooth 4.0 module is used. For capability with devices support Bluetooth 2.1 and below, a RN-42 Bluetooth module is used.

iii. Receiver Device

The receiver device can be based on a computing (mobile) device with the associated software applications or a receiver dongle. The receiver device can receive notification messages from the wireless base station. In certain hardware configurations, the receiver device can receive notification messages directly from sensor nodes. The function of the receiver device is to inform a user of any sensor trigger events through visual, haptic and/or audio feedback.

The computing (mobile) device is used for communication with the wireless base station. This could include any form of (portable/wearable) computing device that supports software and hardware requirements. The basic hardware requirements for the device include Bluetooth, Wi-Fi, display screen, user input capability (capacitive touch or physical buttons) and audio output capabilities (speaker). Software requirement varies from the operating system on the device. For example a mobile phone running on Android 4.0 and above, and iOS version 6.0 (with Bluetooth 4.0 support) and above may be used.

Figure 4:
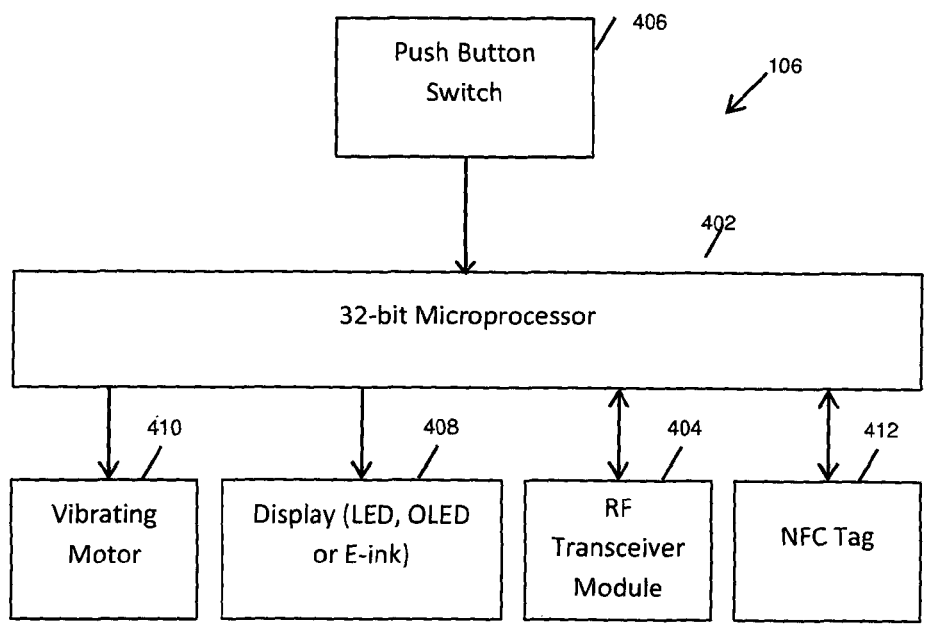
FIG. 4 is a hardware block diagram of a receiver dongle.

FIG. 4 shows the receiver dongle 106 which can be used for communication with the wireless base station 104 or with sensor nodes 102. The dongle is based on a 32-bit ARM microprocessor 402 and a wireless RF module 404. In addition, it comes with a mechanical push button switch 406 for user input. Visual output is provided by either a tri-color LED, OLED or E-ink display 408. A vibrating motor 410 is used to provide haptic feedback. An NFC tag 412 is used for contactless information exchange. For example an ARM Cortex-M4 microprocessor may be used, connected to a nRF24L01+2.4 GHz transceiver. An OLED display with SSD1306 controller and a LED are used to provide visual output. A 3.7V Li-Polymer battery is used to power the device.

Firmware i. Sensor Node

The firmware running on each sensor node is interrupt based. In order to reduce power consumption and increase the operating time of the sensor node, the device is put to sleep most of the time unless an interrupt occurs. There are three interrupt events that can occur; a user input (from the push button 206, rotary encoder 208 and/or accelerometer 204), microphone 202 input (exceeding a predefined threshold) and from the wireless module 214 (when there is data available to be read).

Figure 5:
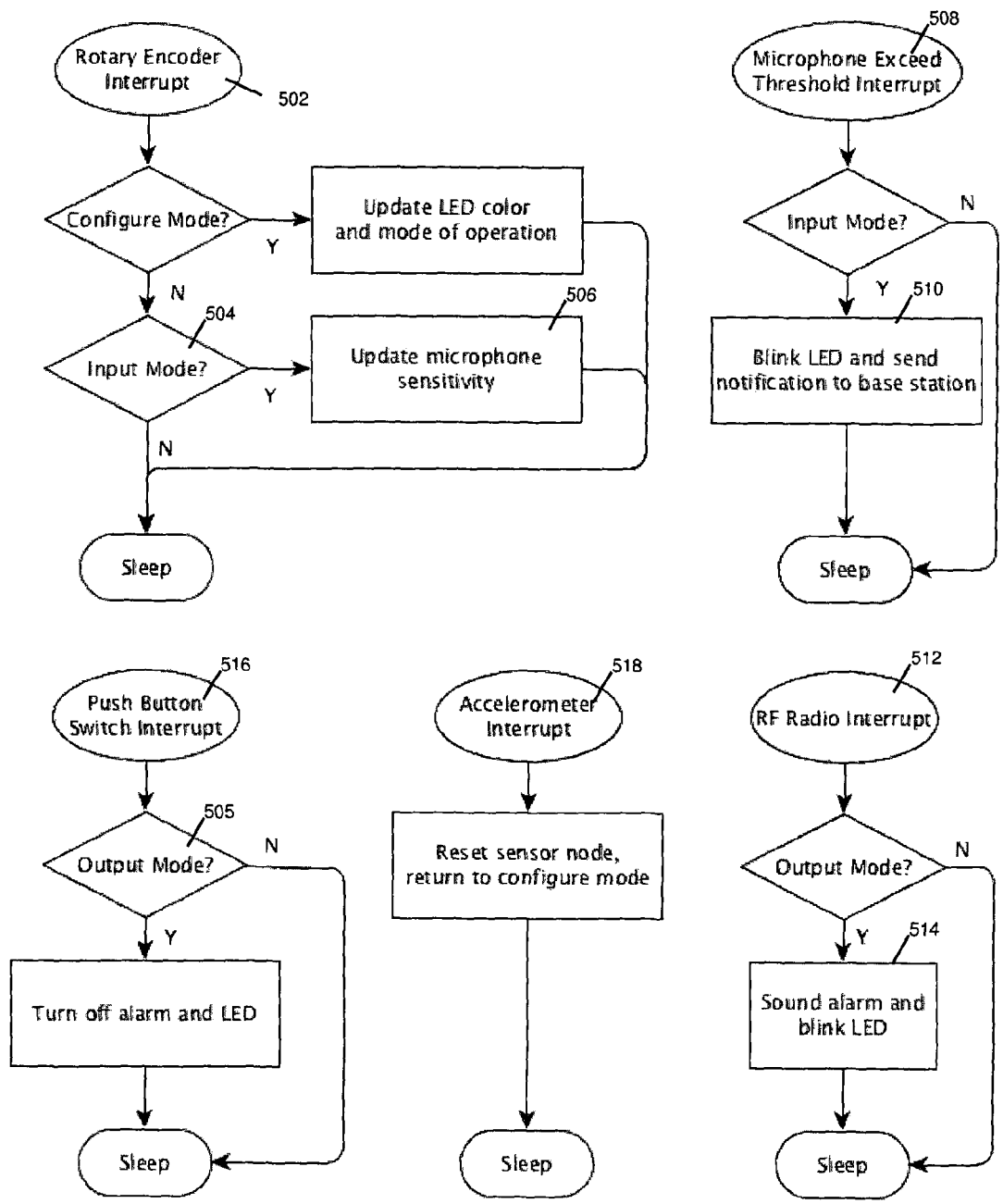
FIG. 5 is a generalized flow chart of sensor node firmware.

When the device is first switched on or reset, it defaults to configure mode, which is activated by pressing on push button switch 206. As shown in FIG. 5 first interrupt 502 is based on a user selecting between 2 further different modes of operation by turning the rotary encoder 208. The colour on the LED 212 cycles between red and green to indicate the mode of operation. To activate the selected operation, the user has to press on push button switch 206 on the sensor node. The colour red indicates that device is in Input mode 504, while green indicates that it is in Output mode 505.

In the Input Mode, the device serves a sound monitoring function using the on-board microphone 202. A user can further adjust the sensitivity of the microphone by turning 506 on the rotary encoder 208 in which the LED 212 changes its brightness accordingly. Whenever the microphone 202 receives a sound exceeding the defined threshold 508, the LED 212 on sensor node will start blinking 510 and a message containing the ID of the sensor node will be sent to the base station.

In Output Mode, the device becomes a receiver to support an output triggering function. The sensor node waits for an incoming command received through the RF module 214. Upon receiving this command 512, it activates 514 the speaker 210 to produce a beeping tone and also blinks the LED light 212. A user can turn off the alarm and light by pressing 516 on the push button 206 switch on the sensor node device. The user can also shake 518 the device to reset to configure mode.

ii. Wireless Base Station

Figure 6:
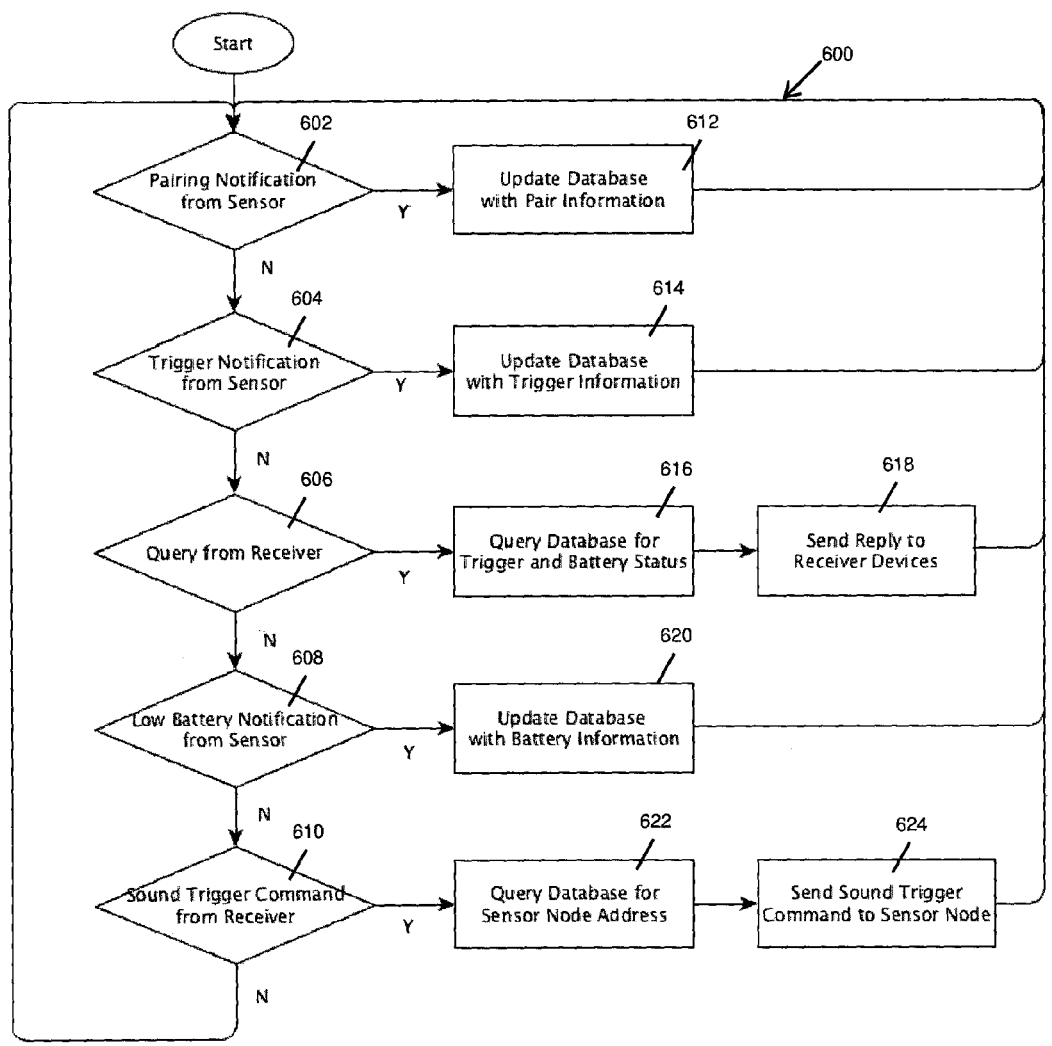
FIG. 6 is a generalized flow chart of base station firmware.

FIG. 6 shows the firmware 600 on the wireless base station configured to listen to incoming data packets sent either from the sensor node or from the receiver device. A database containing the device id of sensor nodes and their destination receiver devices is maintained in the server. Battery status of each sensor node is updated regularly on the database. An incoming data packet can be one of 5 possible commands:

a. Pairing notification 602 sent from a sensor node. This data consist of the sensor node device ID and its destination ID of the receiver device
b. Trigger notification 604 from the sensor node. The data consist of the device ID of the sensor node, indicating that the sensor has been triggered
c. A query command 606 from the receiver device to check for sensor trigger and battery status
d. Low battery notification 608 sent from a sensor node
e. Trigger sound 610 on sensor node command from the receiver device For a pairing notification 602, the program updates the database 612 with the sensor node device ID and the destination ID of the receiver. For a trigger to notification 604, the program sets a trigger status flag 614 in the database indicating that a particular sensor node has been triggered. For a query command 606, the program retrieves 616 the status flags from the database based on the ID of the receiver device and sends a reply 618 to the receiver to indicate if the sensor node has been triggered or if it is running low on battery power. For a low battery notification 608, the program updates a battery status flag 620 in the database indicating that the sensor node has running low on battery power. For trigger sound 610, the program receives a command 622 to query the ID of the sensor node tagged to the receiver and then issues a command 624 to the sensor node to trigger sound on it.

iii. Receiver Dongle

Figure 7:
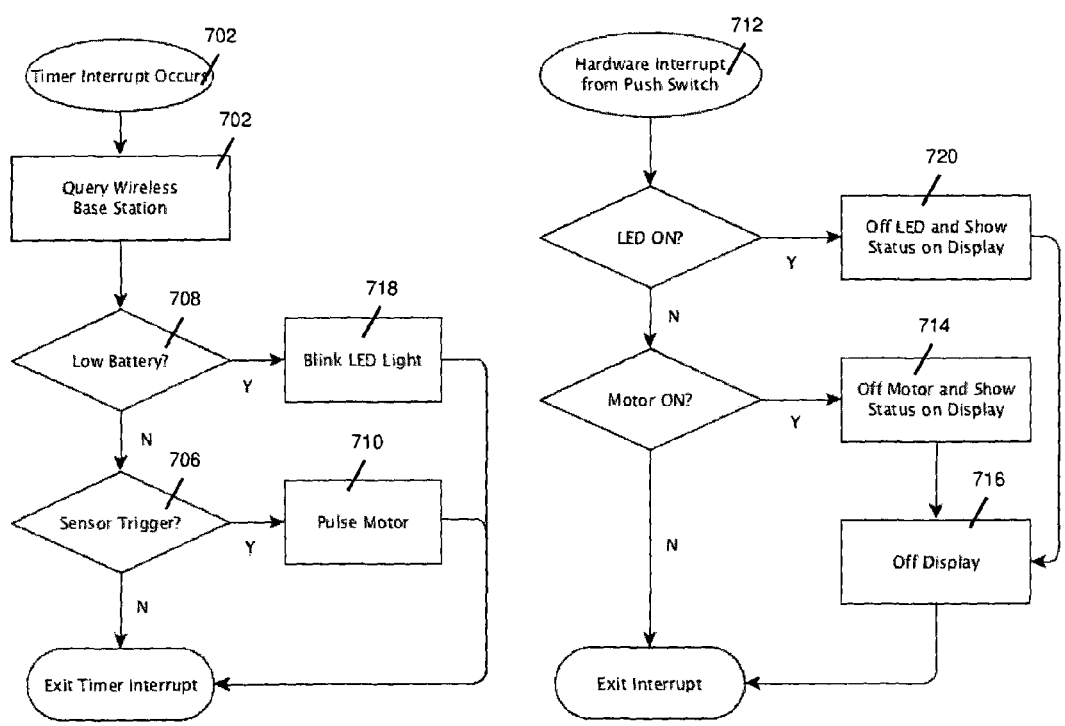
FIG. 7 is a generalized flow chart of receiver dongle firmware.

FIG. 7 shows the receiver dongle 106 runs on a timer interrupt 702, waking up from sleep mode at regular intervals to query 704 the wireless networking base station for the status of sensor nodes that it is paired with. It will receive a reply message on the trigger status 706 and battery status 708 of the sensor nodes it is paired with. If the trigger status is set active, vibrating motor will pulsed 710 on a regular interval. The vibration will stop only when the user presses on the push button switch 712, in which the OLED display will be turn on for 10 seconds to indicate the ID 714 of the sensor node that has been triggered. The OLED display will be turned off 716 after 10 seconds. If the battery status is set active, the LED light is set to blink 718 at regular intervals. When the user presses the push button switch 712, the LED will be turned off and the OLED display turn on for 10 seconds 720 to show the ID of the sensor node that is low on battery power. After 10 seconds, the display will be turned off 716.

For the sensor node and receiver device, the software is standalone, written and complied specifically for the microprocessor type. For example, the firmware on the sensor node and receiver device is developed in C on a 32 bit ARM microprocessor. But it can be generalized to work on any microcontroller/microprocessor that meets the specified hardware requirements.

Software Application for Mobile Device

Figure 8:
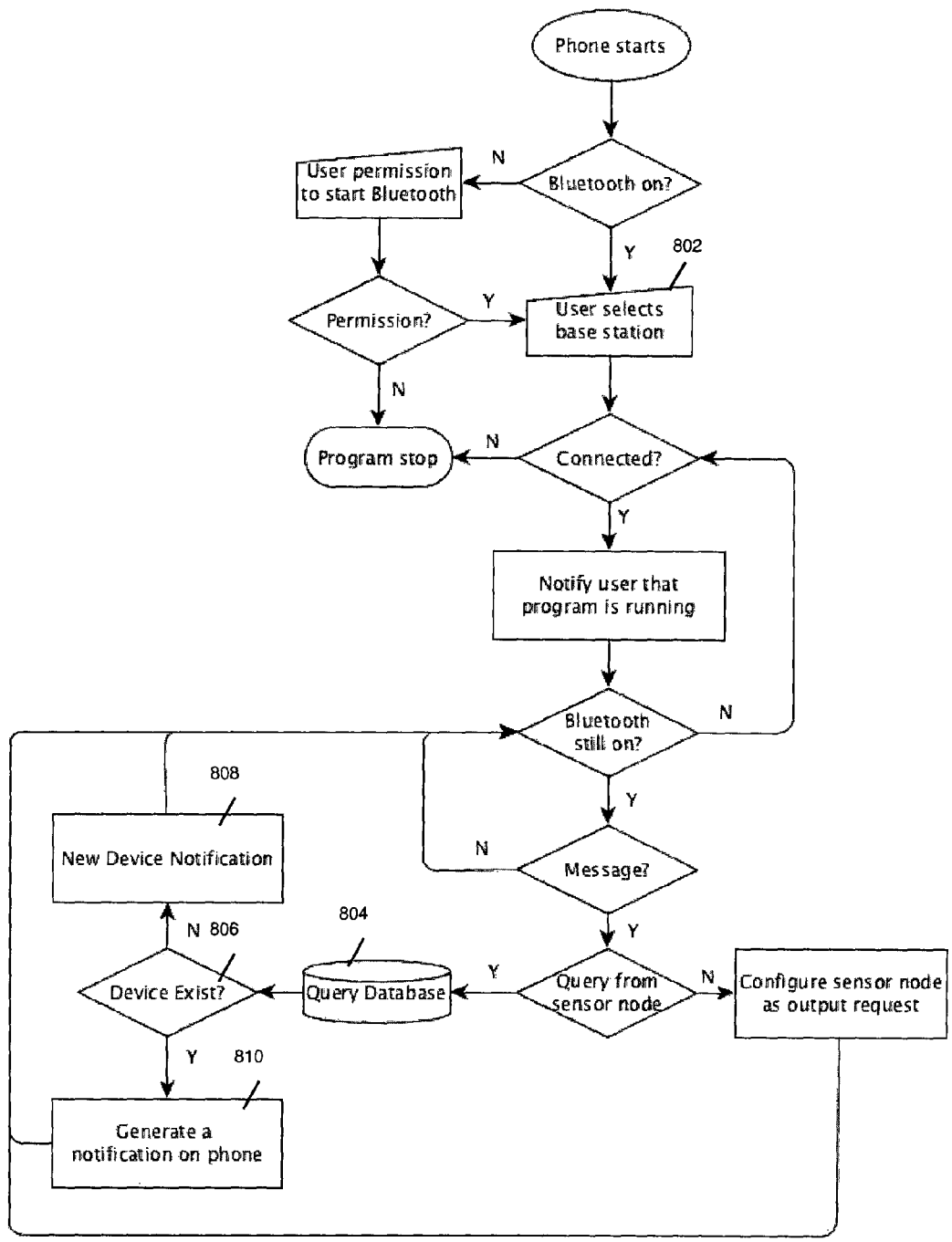
FIG. 8 is a software application flowchart.
Figure 9:
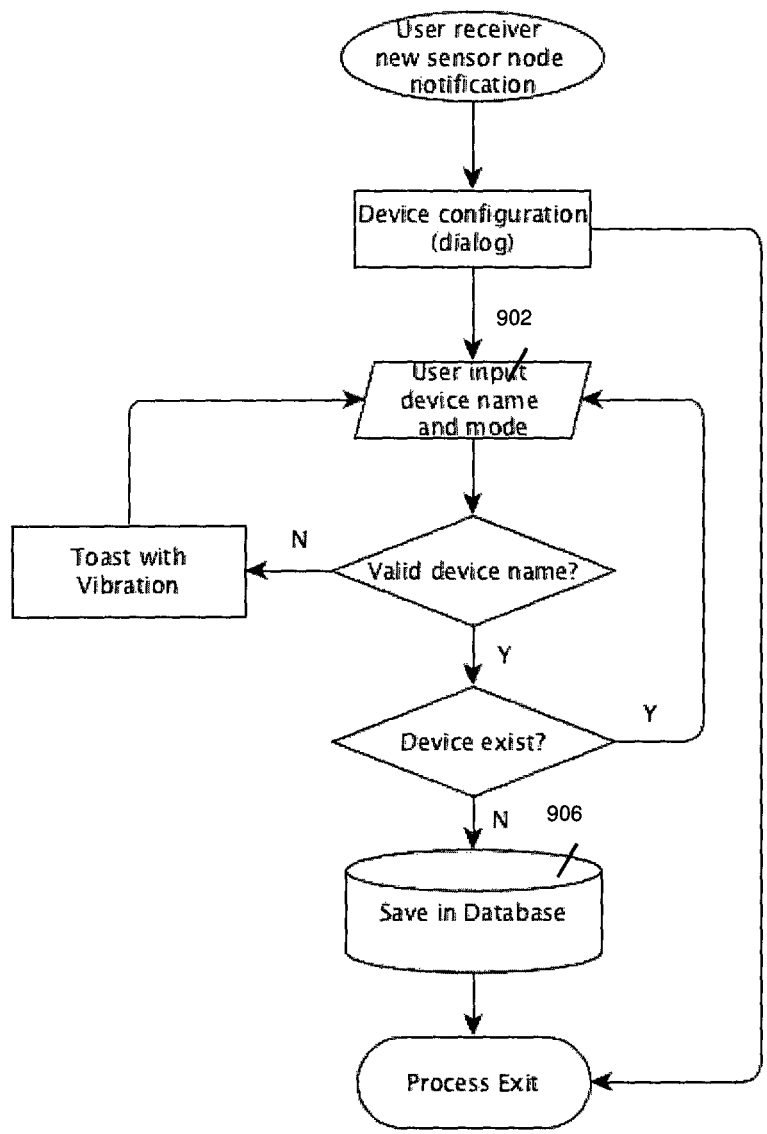
FIG. 9 is a software application flowchart.
Figure 10:
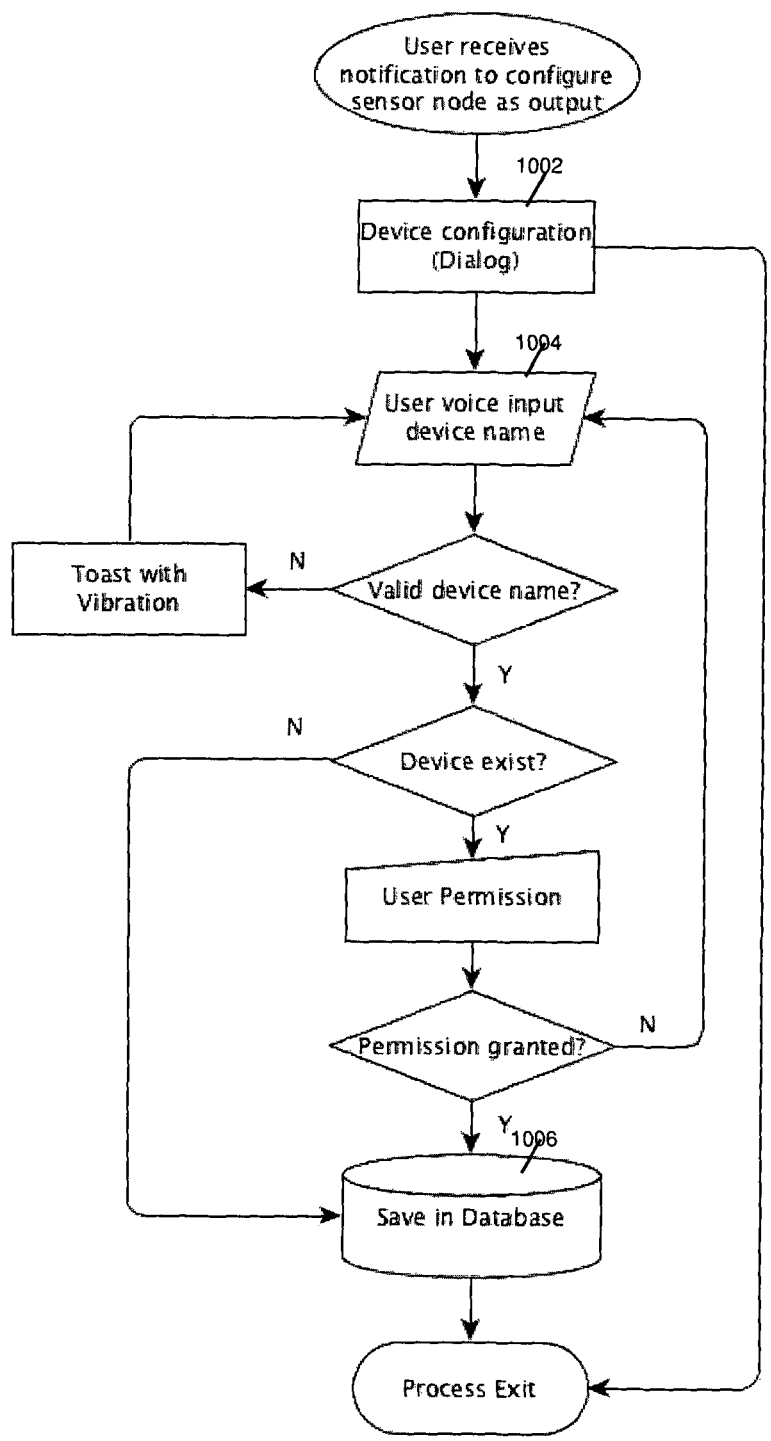
FIG. 10 is a software application flowchart.
Figure 11A:
FIG. 11(*a*) is a screenshot of setting up a connection to the base station.
Figure 11B:
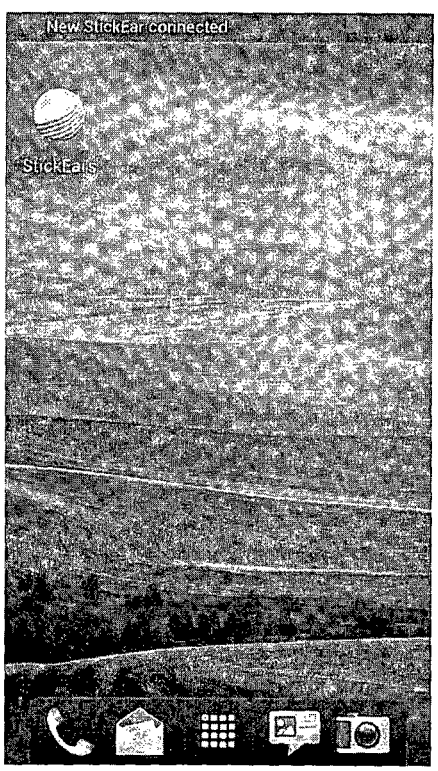
Figure 11C:
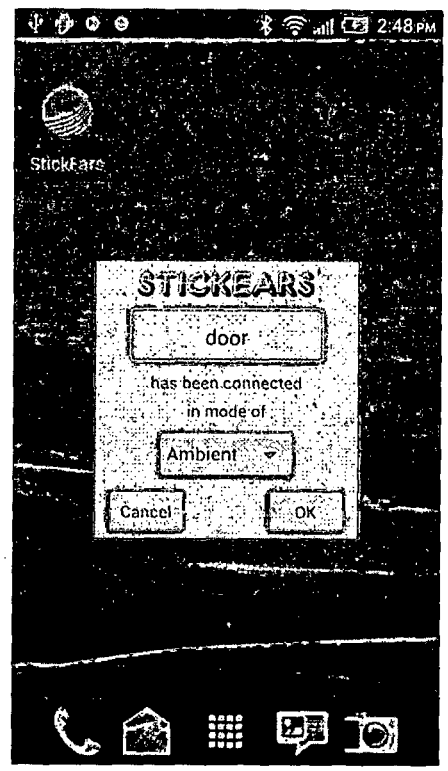
Figure 11D:
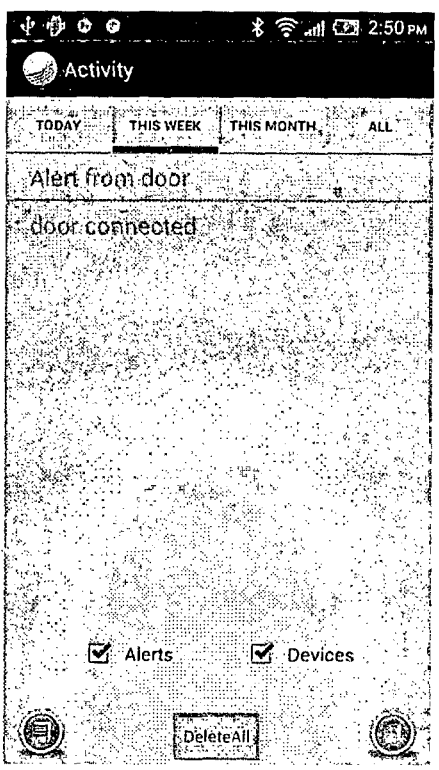
Figure 11E:
Figure 11F:
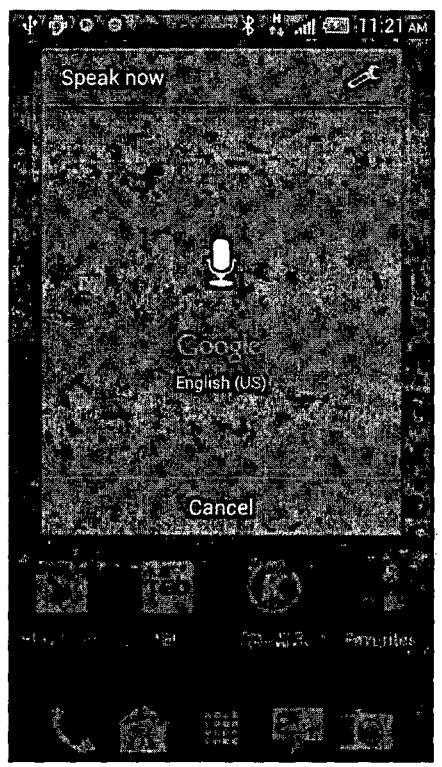

FIG. 8 shows a software application 106 on a mobile device running Android 4.0 operating system. The software application works with sensor nodes that are configured as input sound monitoring devices or as remote sound (alarm) output devices. In the input sound monitoring mode, the software application waits for incoming messages from the Bluetooth enabled wireless base station 802 which receives its incoming data from a sensor node. This message is checked 804 against a database of stored IDs (unique for each sensor node). If the ID is not present in the database 806, it is recognized as a new device setup 808. As shown in FIG. 9 the user is promoted for a device name assignment 902 and notification type (ambient OR alert), shown in FIG. 11c. For example, a user 'sticks' a sensor node on the door and gives a knock on the door to trigger it for the first time in which the software application recognizes this as a new device setup. The user enters a name assignment, e.g. "door". This name assignment is tagged to the ID of the sensor node and is stored in the database 906. Subsequent messages received by the application will generate an appropriate notification 810 (a passive message on the notification bar for 'ambient' types and message with vibration and sound for 'alert' type) to the user (since a match is found in the database) to inform the user of a sound event happening to that particular sensor node The software application is shown in FIG. 10 as an output triggering mode. The user initiates a setup to link a sensor node to the software. The mobile phone application receives a setup prompt 1002 in which it opens up a voice input request 1004. The user assigns a voice tag (converted to text using a speech to text engine) to the ID of the sensor node which is then stored in the database 1006. Whenever the user needs to remotely trigger an alarm output to a specific sensor node, he or she opens the mobile phone application and issues a voice command which will be searched through the database for a matching voice tag and its corresponding device ID. When a valid voice tag is found, the software application sends a message to the wireless base station which in turn, routes the message to the corresponding sensor node (based on the unique node ID) to activate the alarm on it.

The software application on the mobile computational device can be written for various platforms including (but not limited to): Android OS, iOS, MeeGo, Symbian and Windows mobile.

FIG. 11(*a*) shows the Android application background service: Setting up a connection to the base station. FIG. 11(*b*) shows the background service: Notification from a new sensor node. FIG. 11(*c*) shows a background service: Configuring new sensor node by assigning it a name and a mode. In Alert mode, a user will be alerted with a sound, vibration and a message. In Ambient mode, a user only receives notification message. FIG. 11(*d*) shows a main user interface: displays a history of activities and events and allows reconfiguring of devices. FIG. 11(*e*) shows the background service: Setting up a sensor node as an object finder. User records a voice tag to associate it with the sensor node. FIG. 11(*f*) shows the background service: User gives a voice command to activate sound on the sensor node.

External Design i. Sensor Node

Figure 12:
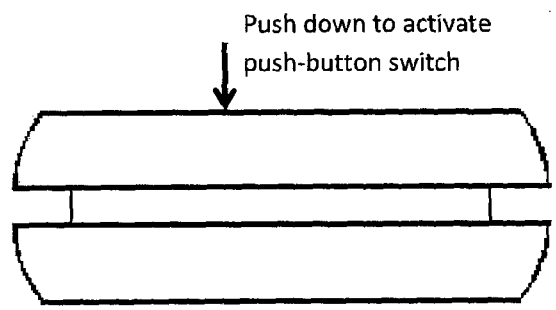
FIGS. 12(*a*) to (*c*): are perspective views of a physical design of a sensor node.
Figure 12:
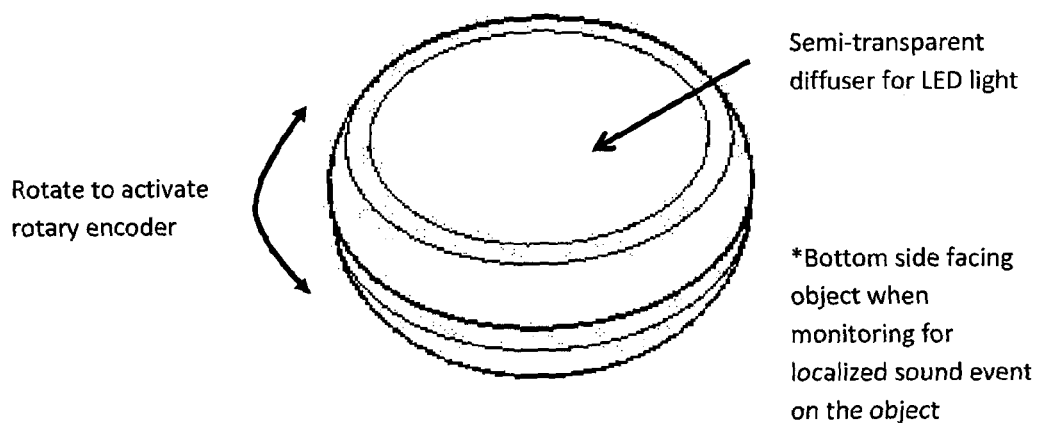
Figure 12:
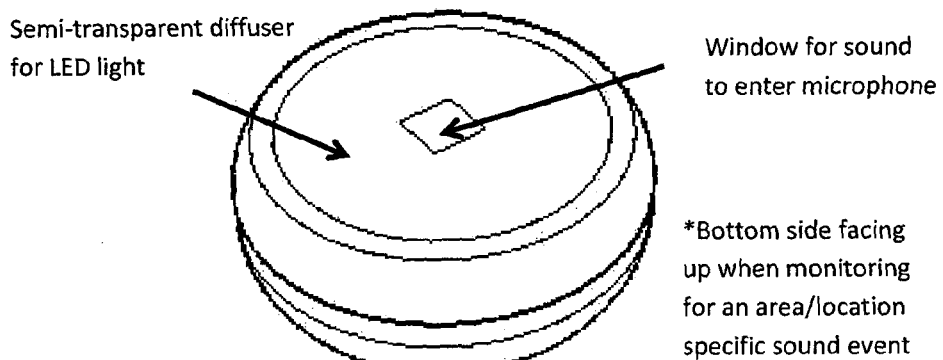
Figure 12:
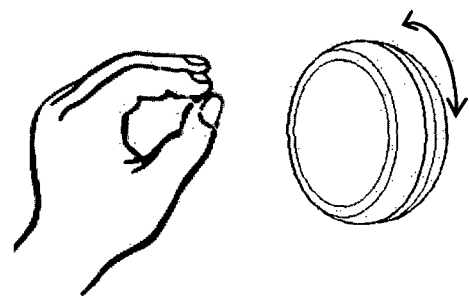
Figure 12:
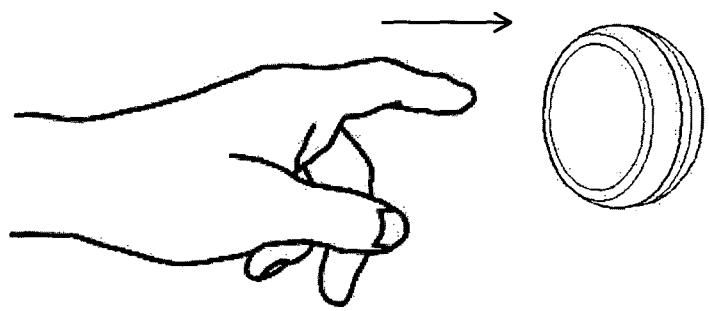
Figure 12:
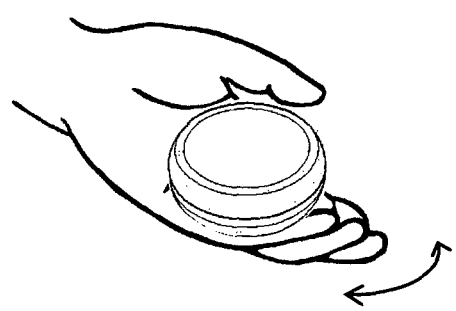

The design of the sensor node may include two disks mounted so that they can be rotated relative to each other to trigger a rotary encoder as shown in FIGS. 12(*b*) and 12(*d*). The casing can also be depressed to activate a push button switch as shown in FIGS. 12(*a*) and 12(*e*).

The flat surface on the top and bottom side of the casing has a semi-transparent diffuser that allows colour light from a RGB led to be seen as shown in FIG. 12(*c*). The design is almost symmetrical except for an opening on the bottom side of the flat surface that allows better sound pickup by the microphone. The flat surfaces of the sensor node allow adhesive material eg: Scotch® Reusable Tabs to be used to facilitate mounting to a surface. Sensor nodes can be redeployed easily, hence it should be easy to mount and detach, and the mounting mechanism needs to have a long "adhesive lifetime" without its "stickiness" wearing off over time. Also a micro suction cup based material eg: Inventables® Suction Cup Tape could be used. This adhesive material can be shaped to a circular ring that would fit on the flat surface of the sensor node.

With a symmetric design on a sensor node, each side can serve a different function. When using the sensor node to monitor a sound event on a specific object, the sensor node is attached to the object with its bottom surface facing down such the microphone is facing toward the surface of the object. It is to maximize sound reception from only the object and not from the surroundings. On the other hand, when using the sensor node to monitor for sound events around an area, the bottom side of the sensor node is facing outward so that it can readily receive sound from the surrounding area.

There is only one LED inside the sensor node but it produces a light that is visible on both sides. A user will see the whole sensor node lighting up regardless of which side it is attached to. Also, there is only 1 push button switch, which can be triggered from either side of the sensor node.

The LED will light up and blink when it detects sound regardless of whether it is monitoring an object or a space. It will also start blinking when a user remotely triggers sound on the sensor node.

The visual feedback may be in the form of a single LED or any form of visual display such as an OLED display screen or an E-Ink display.

The (directional) microphone may be oriented such that its main receiving lobe is toward the front face of the sensor node.

ii. Receiver Dongle

Figure 13:
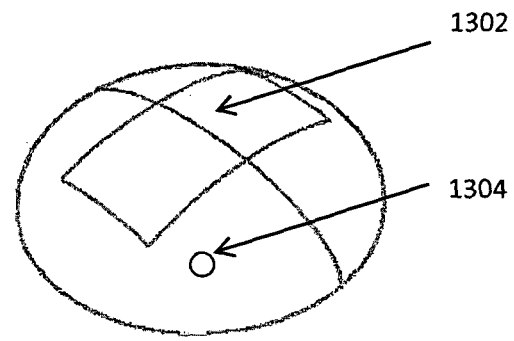
FIG. 13 is a perspective view of a physical design of a receiver dongle.
Figure 13:
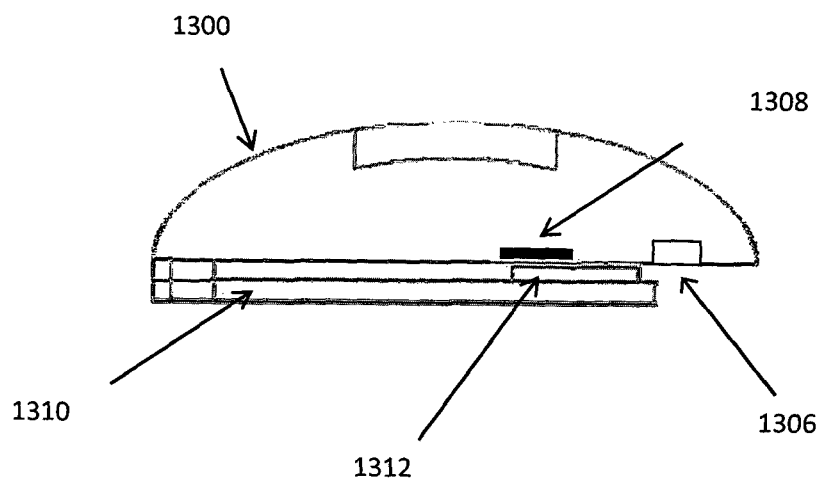

As seen in FIG. 13(*b*) the receiver dongle is housed in a half spherical dome shaped casing 1300. On the front facing curved side, seen in FIG. 13(*a*), are an OLED display screen and 1302 a LED indicator 1304. A micro-USB female connector 1306 is available on the back (flat) side of the housing for charging the device. A magnet 1308 is mounted on the inside of the back surface and a flat flexible arm 1310 extends from the side of the casing to the position of the magnet such that the arm locks in 1312 firmly based on the magnetic attraction force. This enables a user to easily wear the dongle by clipping it between a relatively thin and flat surface. For example a user can clip the dongle on his or her pocket or watchstrap etc. A user can also attach a chain through an opening between the housing and flexible arm and wear the dongle around his or her neck.

Setting-up and Interacting with Sensor Nodes

In this current embodiment of the system, a user physically interacts with the sensor node through three means of action: turning the face of the device, pressing the face of the device and shaking the device. Each of these user actions has been programmed for specific functions. We define the following user inputs and possible actions:

Turning: Adjust sensitivity of the sensor/Selecting different modes of operation.

Pressing: To enter a command.

Shaking: Reset the device/Cancel an event shown in FIG. 12(*f*).

Pairing between Sensor Nodes and Receiver Devices

A user can establish pairing between sensor nodes and receiver devices by bringing them within close proximity (4 cm or less). The various pairing configurations include:

Single receiver device paired to single sensor node

Single receiver device paired to multiple sensor nodes

Multiple receiver devices paired to a single sensor node

Multiple receiver devices paired to multiple sensor nodes

A pairing sequence involves the user bringing the receiver device close to the sensor node in which the LED on the sensor node will blink for 5 seconds to indicate a pairing request has been initiated and completed. The sensor node will read the ID of the receiver device using the on-board contactless communication controller, and forward this information to the wireless networking base station, to be subsequently stored in its database. The pairing can either relate to a mobile phone with the software app, or a receiver dongle.

Output Modalities:

LEDs may be used to provide a visual output feedback. An RGB LED is used for provide feedback on the level of sensitivity of the sensor during calibration by the user and also used as an indicator of the strength of the signal measured by the sensor. The use of (coloured) light is not limited to the above scenarios, but can be generalized to any forms of interaction providing visual output feedback, such as a small OLED or E-ink display.

Sound may be used as a complementary output feedback. A speaker is used to generate a tone which is remotely triggered by a user, or other sound such as music, voice, etc.

Figure 14:
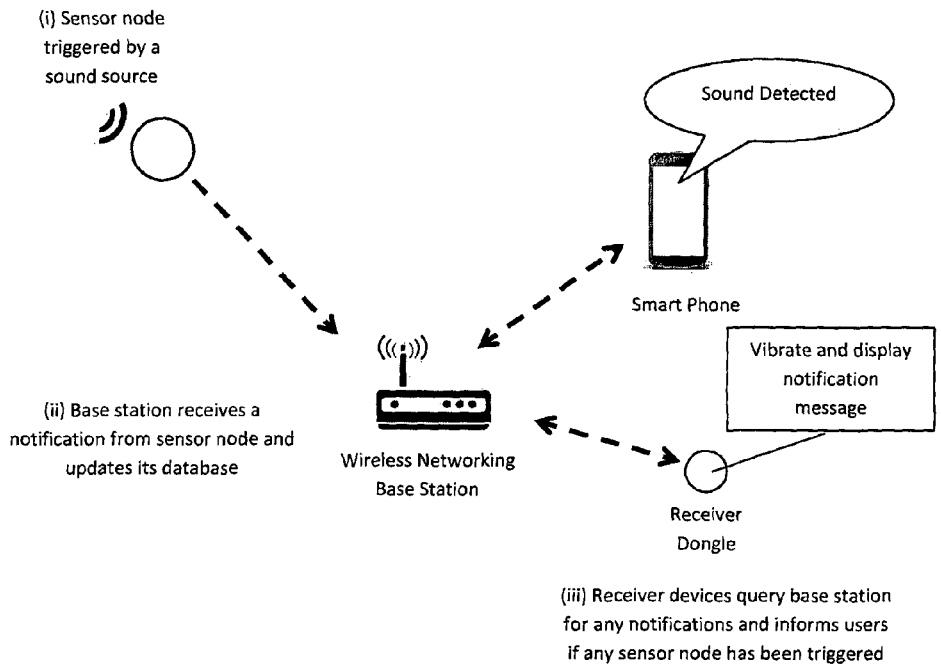
FIG. 14 is a schematic drawing of remote monitoring of object specific or location specific events captured by a sensor node.

Example Applications i. Remote Monitoring of Everyday Object(s) Specific or Location Specific FIG. 14 shows sensor nodes can be attached to an object for localized monitoring, for example, attaching it to a door to detect a door knocking sound. Alternatively, a location specific application would mean to increase the sensitivity of the sensor node such that it response to a wider physical space, for example an area in a room. Users can easily change the object/space they want to monitor—for example, detaching the sensor node from door and attaching it to telephone.

ii. Remote Event Triggering on an Object

Figure 15:
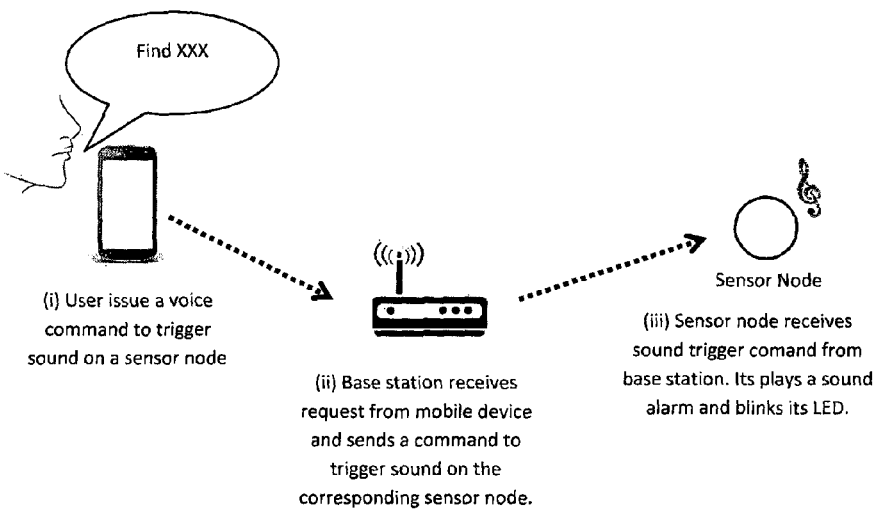
FIG. 15 is a schematic drawing of remote event triggering on a sensor node.

FIG. 15 shows a computational device (e.g Smart phone) can be worn/carried by a user, and he or she can activate a sensor node to trigger an output event. A voice command issued to the computational device can be used to trigger an alarm output on a sensor node attached to a specific object(s) thus enabling the user to find the object by 'hearing' where it is. As in the previous case, users can switch sensor node between different objects seamlessly.

iii. Autonomous Response to Events without External Intervention from a User (e.g. Sensor Input Triggers a Predefined Output)

Figure 16:
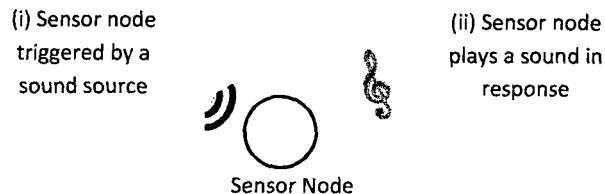
FIG. 16 is a schematic drawing of autonomous response to sound events by a sensor node.

FIG. 16 shows a sensor node is able to detect and identify a particular type of sound event and provide an immediate response. For example, detection of a crying baby triggers an output music being played.

iv. Collaboration between Sensor Nodes a. Collective Input Monitoring/Capturing

Figure 17A:
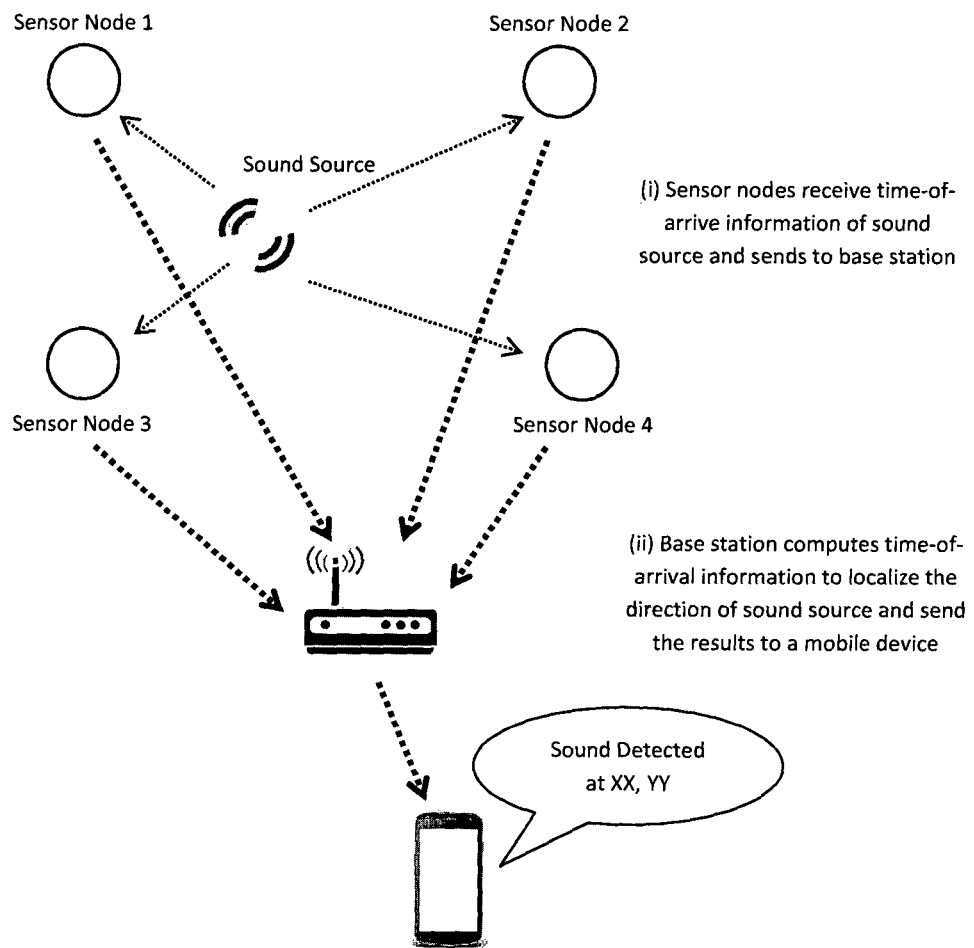
FIG. 17 are schematic drawings of collaboration between sensor nodes (a) Collective Input (Sound localization example), (b) Collective Output (Stereo/Multi channel sound output), (c) Input from sensor node(s) triggering response on other sensor nodes or vice versa.

FIG. 17(a) shows the ability to perform sound source localization using time of arrival with a plurality of sensors nodes around the sound source.

b. Collective Output

Figure 17B:
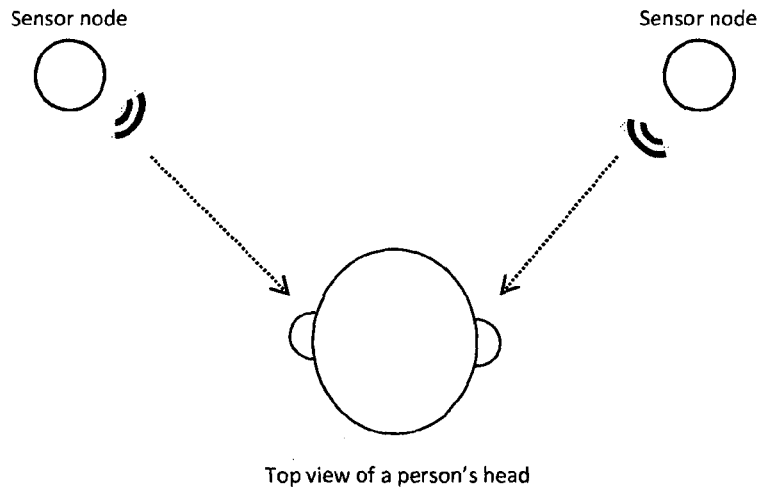

FIG. 17(b) shows with sound as output, multiple sensor nodes can be place at strategic locations to create multi-channel sound effects. Alternatively, with light as an output, sensor nodes can be treated as individual pixels and collectively be used to generate a display with higher dimensionality.

c. Input from Sensor Node(s) Triggering Response on other Sensor Node(s) or Vice Versa.

Figure 17C:
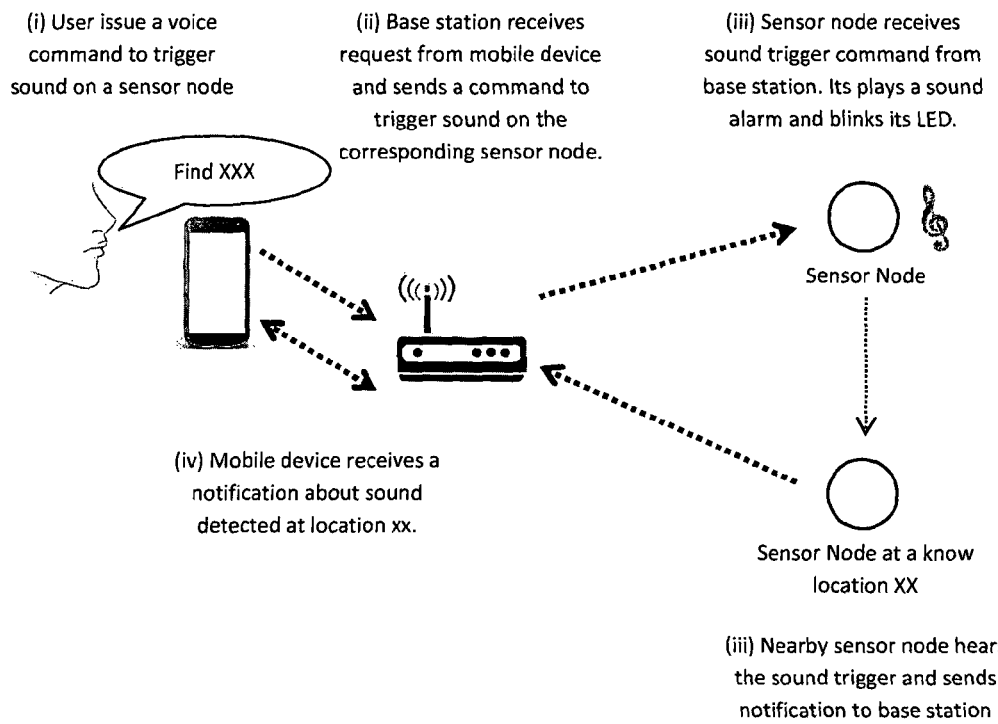
Figure 18:
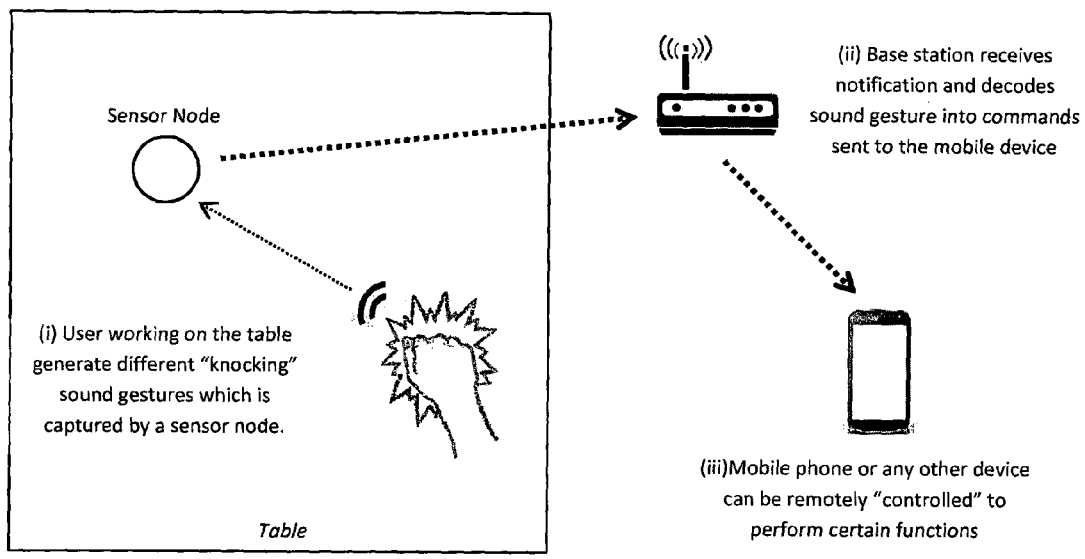
FIG. 18 is a schematic drawing of application as an input device for interacting with digital devices.

FIG. 17(c) shows sensor nodes reacting and communicating to each other. One example would be sensors relaying messages. Recognition algorithms may be included to detect/classify specific sounds and generate different output accordingly.

v. Sensor Nodes Transforming an Everyday Object into a Sound Based Input Device for Interacting with Personal Digital Devices The in-built sensing capabilities of each sensor node enables it to be used an alternate input device that remaps its input measurements to inputs for other devices. For example, FIG. 18 shows cancelling a call without having to take the phone out by tapping on the pocket/hand carrier; augmenting a desktop space such that tapping/scratching on a physical table becomes an interaction mode to desktop computer.

vi. Industrial Applications

Security alarms, remote monitoring, data logging, fault monitoring vii. Commercial Applications Assistive technologies for the hearing impaired and visually impaired. It can be used as a sound event monitoring device for the hearing impaired or an object locator for the visually impaired.

Intelligent home sensor network

Input device for digital devices (mobile phones, notebook computers)

While example embodiments of the invention have been described in detail, many variations are possible within the scope of the invention as claimed as will be clear to a skilled reader.

The invention claimed is:

1. A distributed wireless sensing device comprising:
at least one input sensor,
at least one output transducer configured to indicate receipt of a trigger by the sensing device,
a wireless communication module configured to send and receive data, and
a processor configured to receive a local control parameter from the at least one input sensor or a remote control parameter from a remote module communicating with the processor via the wireless communication module, and
wherein the processor is further configured to allow selection of one of a plurality of operational configurations, wherein the selection of one of a plurality of operational configurations allows selection of whether, upon receipt of a trigger by the sensing device, to
(i) indicate the receipt of the trigger with the at least one output transducer;
(ii) send data via the wireless communication module; or
(iii) perform both (i) and (ii); and wherein
the at least one input sensor includes a microphone, an accelerometer, a button and/or a rotary encoder and/or the at least one output transducer includes a speaker, vibrating motor, a multi coloured light, a single LED, a OLED display and/or an E-lnk display and/or the device further comprises a near field communication module for pairing; and
wherein the distributed wireless device further comprises two disks rotatable about a housing an engaged with the rotary encoder to sense the turning of the device, wherein the device is configured to monitor triggers from a first direction when mounted to a surface with a first of the two disks, and configured to monitor triggers from a second direction when mounted to a surface with a second of the two disks.

2. The device in claim 1 wherein the trigger is caused by sensor input received by the at least one input sensor or by data received through the wireless communication module.

3. The device in claim 1, wherein the local control parameter is determined by turning, pressing and/or shaking the device.

4. The device in claim 3, wherein turning the device is configured to adjust sensitivity of the at least one input sensor or to select an operational configuration, pressing the device is configured to enable entering a command and shaking the device is configured to reset the device or cancel an event.

5. The device in claim 1, wherein the plurality of operational configurations include a configuration mode, an input mode and an output mode.

6. A distributed wireless sensing system comprising:
a plurality of sensing nodes, wherein each sensing node comprises a distributed wireless sensing device according to claim 1,
a wireless remote module, and
a base station or master node configured for wirelessly communicating with each node and the remote module,
wherein the remote module is configured for coordination and/or processing of events and data collected by each node.

7. The system in claim 6, wherein the wireless remote module is an app on a mobile telephone.

8. The system in claim 6, wherein the wireless remote module is a receiver dongle.

9. The system in claim 8, wherein the receiver dongle includes a wireless module, an illumination device, a vibration device and a display, the display configured to identify a sensing node which has triggered an event.

10. The system in claim 9, wherein the receiver dongle and a sensing node are configured to pair with each other when in close proximity.

11. The system in claim 6, comprising configuration modes which include a selection from the group consisting of:
remote monitoring of object, and an alert relates to movement of the object or a sound originating in the object;
remote event triggering on an object, where an alert is user triggered and a selected node outputs lights and/or sound cues;
immediate response management of events, where a noise event at a node immediately triggers an output sound at the same node;
collaboration between nodes, where the location of a sound origin can be determined based on the measurements at multiple nodes;
collective output, where multiple nodes can output in a coordinated fashion to create multi-channel sound effects or to generate a lighting effect or display;
sequential effect, where an input from one node(s) triggers an output on another node(s) or vice versa;
controlling the remote module, where an input to a node may select an action on the remote module;
and any combination thereof.

12. A distributed wireless sensing device comprising:
a rotary selector configured to adjust sensitivity of a sensor,
a pressure sensor or switch configured to enable entering a command,
a movement sensor configured to reset the device or cancel an event, and
a processor configured to select one of a plurality of operational configurations, wherein the selection of one of a plurality of operational configurations allows selection of whether, upon receipt of a trigger by the sensing device, to
(i) indicate the receipt of the trigger with at least one output transducer;
(ii) send data via a wireless communication module; or
(iii) perform both (i) and (ii); wherein
the sensor includes a microphone, an accelerometer, a button and/or a rotary encoder and/or the at least one output transducer includes a speaker, vibrating motor, a multi coloured light, a single LED, a OLED display and/or an E-lnk display and/or the device further comprises a near field communication module for pairing; and
wherein the distributed wireless device further comprises two disks rotatable about a housing an engaged with the rotary encoder to sense the turning of the device, wherein the device is configured to monitor triggers from a first direction when mounted to a surface with a first of the two disks, and configured to monitor triggers from a second direction when mounted to a surface with a second of the two disks.

13. The device in claim 12, wherein the trigger is caused by sensor input received by the sensor or by data received through the wireless communication module.

14. The device in claim 2, wherein the local control parameter is determined by turning, pressing and/or shaking the device.

15. The system in claim 7, wherein the configuration modes include a selection from the group consisting of:
remote monitoring of object, and the alert relates to movement of the object or a sound originating in the object;
remote event triggering on an object, where the alert is user triggered and a selected node outputs lights and/or sound cues;
immediate response management of events, where a noise event at a node immediately triggers an output sound at the same node;
collaboration between nodes, where the location of a sound origin can be determined based on the measurements at multiple nodes;
collective output, where multiple nodes can output in a coordinated fashion to create multi-channel sound effects or to generate a lighting effect or display;
sequential effect, where an input from one node(s) triggers an output on another node(s) or vice versa;
controlling the remote module, where an input to a node may select an action on the remote module;
and any combination thereof.

16. A distributed wireless sensing system comprising:
a plurality of sensing nodes, wherein each sensing node comprises a distributed wireless sensing device comprising
at least one input sensor,
at least one output transducer configured to indicate receipt of a trigger by the sensing device,
a wireless communication module configured to send and receive data, and
a processor configured to receive a local control parameter from the at least one input sensor or a remote control parameter from a remote module communicating with the processor via the wireless communication module, and
wherein the processor is further configured to allow selection of one of a plurality of operational configurations, wherein the selection of one of a plurality of operational configurations allows selection of whether, upon receipt of a trigger by the sensing device, to
(i) indicate the receipt of the trigger with the at least one output transducer;
(ii) send data via the wireless communication module; or
(iii) perform both (i) and (ii);
a wireless remote module, and
a base station or master node configured for wirelessly communicating with each node and the remote module,
wherein the wireless remote module is configured for coordination and/or processing of events and data collected by each node; and wherein the wireless remote module is a receiver dongle, which includes a wireless module, an illumination device, a vibration device and a display, and wherein the display is configured to identify a sensing node which has triggered an event.

* * * * *